United States Patent [19]

Müller

[11] Patent Number: 4,698,368
[45] Date of Patent: Oct. 6, 1987

[54] MIXTURES OF ORGANO-TIN COMPOUNDS

[75] Inventor: Horst Müller, Fürth/Odenwald, Fed. Rep. of Germany

[73] Assignee: Ciba-Geigy Corporation, Ardsley, N.Y.

[21] Appl. No.: 575,482

[22] Filed: Jan. 30, 1984

Related U.S. Application Data

[63] Continuation of Ser. No. 301,674, Sep. 14, 1981, abandoned, which is a continuation of Ser. No. 122,786, Feb. 19, 1980, abandoned.

[30] Foreign Application Priority Data

Feb. 22, 1979 [CH] Switzerland ............... 1787/79
Dec. 7, 1979 [CH] Switzerland ............... 10872/79

[51] Int. Cl.$^4$ .............................................. C08K 5/58
[52] U.S. Cl. ........................................ 521/93; 524/180; 524/181
[58] Field of Search ................ 524/180, 181; 521/93

[56] References Cited

U.S. PATENT DOCUMENTS

| | | | |
|---|---|---|---|
| 2,641,588 | 6/1953 | Leistner et al. ............... | 524/180 |
| 2,914,506 | 11/1959 | Mack et al. ............... | 260/45.75 S |
| 3,523,960 | 8/1970 | Hirshman et al. ............... | 260/429.7 |
| 3,562,305 | 2/1971 | Hoch ............... | 524/281 |
| 3,640,953 | 2/1972 | Brecker et al. ............... | 260/45.75 K |
| 3,642,677 | 2/1972 | Brecker et al. ............... | 260/23 X A |
| 3,803,083 | 4/1974 | Brecker ............... | 524/180 |
| 3,819,783 | 6/1974 | Jones ............... | 521/93 |
| 3,909,492 | 9/1975 | Larkin et al. ............... | 260/45.75 S |
| 3,933,741 | 1/1976 | Larkin et al. ............... | 524/181 |
| 3,953,385 | 4/1976 | Dworkin et al. ............... | 524/281 |
| 4,041,014 | 8/1977 | Mack ............... | 260/45.75 S |

FOREIGN PATENT DOCUMENTS

| | | |
|---|---|---|
| 2311798 | 12/1976 | France . |
| 679655 | 9/1952 | United Kingdom . |
| 1008845 | 11/1965 | United Kingdom . |
| 1031487 | 6/1966 | United Kingdom . |
| 1522513 | 8/1978 | United Kingdom . |

OTHER PUBLICATIONS

"Thermolite Stabilizers for Optimum Stabilization of Rigid PVC Foam-" Bulletin of M&T Chemicals, Inc., Rahway, N.J., published 1974.
M&T Technical data Sheets Nos. 112, 132, 301, 319 and 322 published Respectively 1974, 1969, 1973, and 1974, M&T Chemicals Inc., Rahway, N.J.

Primary Examiner—Veronica P. Hoke
Attorney, Agent, or Firm—Harry Falber

[57] ABSTRACT

Mixture consisting of an organo-tin alcoholate of the formula (I)

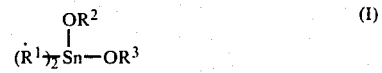

and of an organo-tin mercaptide of the formula (II) or (III)

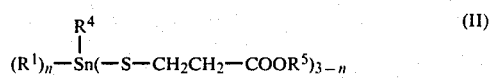

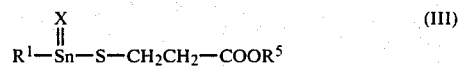

which mixture may additionally contain an organo tin carboxylate of the formula (IV) or (V)

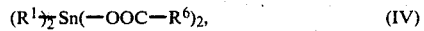

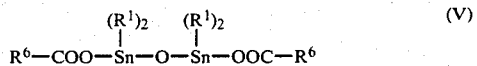

in which formulae $R^1$ is $C_1$–$C_{12}$alkyl, $R^2$ is $C_{10}$–$C_{30}$ alkyl, phenyl which is substituted by one or two $C_8$–$C_{12}$ alkyl groups, $R^3$ has the meaning assigned to $R^2$ or is the —Sn($OR^2$)($R^1$)$_2$ group, wherein $R^1$ and $R^2$ are as defined above, X is sulfur or oxygen, $R^4$ is the —S—$CH_2CH_2$—$COOR^5$ or —X—Sn($R^1$)$_n$(S—$CH_2CH_2$—$COOR^5$)$_{3-n}$ group, in which $R^1$ and X are as defined above, $R^5$ is $C_8$–$C_{14}$ alkyl, n is 1 or 2, and $R^6$ is $C_{10}$–$C_{30}$ alkyl, the weight ratio of I:II or I:III being in the range from 9:1 to 1:9. These mixtures are stabilizers for chlorinated polymers and also activators for the manufacture of foamed plastics.

8 Claims, No Drawings

MIXTURES OF ORGANO-TIN COMPOUNDS

This is a continuation of application Ser. No. 301,674 filed Sept. 14, 1981, now abandoned which in turn is a continuation of application Ser. No. 122,786 filed Feb. 19, 1980, now abandoned.

The present invention relates to mixtures of organo-tin compounds and to chlorinated polymers and foamed plastics materials which contain these mixtures.

Mixtures consisting of an organo-tin mercaptide and an organo-tin compound selected from the group consisting of organo-tin, organo-tin carboxylate, organo-tin alcoholate or organo-tin oxide, are described as effective thermostabilisers in German Offenlegungsshcrift No. 1 926 949. A mixture consisting of an organo-tin thioglycollic acid ester and an organo-tin compound as described above is specifically disclosed in this publication.

As it is known that organo-tin mercaptides lower the impact strength of rigid polymers, there is considerable interest in highly effective stabilisers which can be employed in small amounts.

Organo-tin compounds are also employed as activators for the manufacture of foamed articles composed of plastics. The articles are ordinarily manufactured by known methods, for example by injection moulding, by blending the plastics material with a suitable blowing agent and choosing the processing temperature such that it is above the decomposition temperature of the blowing agent. Often, however, the decomposition temperature is too high above the processing temperature, so that the blowing agent cannot be used alone. For this reason, activators are often employed which hasten the decomposition of the blowing agent and/or lower the decomposition temperature.

German Offenlegungsschrift No. 2 444 991 describes an activator system consisting of organo-tin oxides, organo-tin alcoholates, or of mixtures thereof.

It has now been found that a mixture of organo-tin compounds and of an organo-tin mecaptopropionic acid ester imparts surprisingly good light and heat stability to chlorinated polymers and, in addition, is an effective activator for the manufacture of foamed plastics.

Accordingly, the present invention provides mixtures consisting of an organo-tin alcoholate of the formula (I)

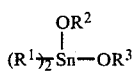  (I)

and an organo-tin mercaptide of the formula II or III

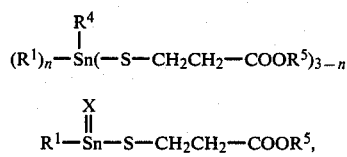

which mixtures may additionally contain an organo-tin carboxylate of the formula (IV) or (V)

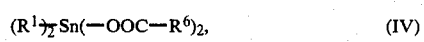

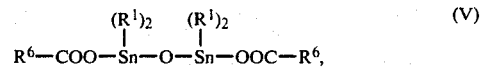

in which formulae $R^1$ is $C_1$–$C_{12}$alkyl, $R^2$ is $C_{10}$–$C_{30}$alkyl, phenyl which is substituted by one or two $C_8$–$C_{12}$alkyl groups, $R^3$ has the meaning assigned to $R^2$ or is the $-Sn(OR^2)(R^1)_2$ group, wherein $R^1$ and $R^2$ are as defined above, X is sulfur or oxygen, $R^4$ is the $-S-CH_2CH_2-COOR^5$ or $-X-Sn(R^1)_n(S-CH_2CH_2-COOR^5)_{3-n}$ group, in which $R^1$ and X are as defined above, $R^5$ is $C_8$–$C_{14}$alkyl, n is 1 or 2, and $R^6$ is $C_{10}$–$C_{30}$alkyl, the weight ratio of I:II or I:III being in the range from 9:1 to 1:9.

The invention also provides mixtures consisting of an organo-tin mercaptide of the formula II or III

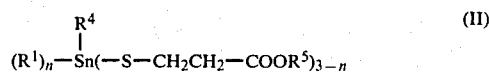

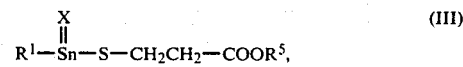

and an organo-tin carboxylate of the formula IV or V

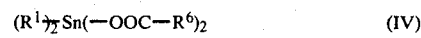

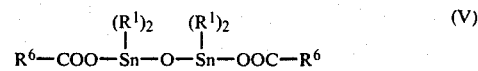

in which formulae the symbols have the meanings assigned to them in claim 1, the weight ratio of II:IV or III:IV being in the range from 9:1 to 1:9.

$R^1$ as $C_1$–$C_{12}$alkyl is e.g. methyl, ethyl, n-propyl, isopropyl, n-butyl, tert-butyl, n-amyl, iso-amyl, n-hexyl, n-heptyl, n-octyl, n-dodecyl. Preferably, $R^1$ is methyl, n-butyl, n-amyl, n-hexyl and n-octyl. Most preferably, $R^1$ is methyl, n-butyl and n-octyl.

$R^2$ and $R^3$ as $C_{10}$–$C_{30}$alkyl can be decyl, dodecyl, isotridecyl, tetradecyl, hexadecyl, 16-methylheptadecyl, nonadecyl, 2-eicosyl, docosyl, tetracosyl or hexacosyl. Preferably, alkyl groups $R^2$ and $R^3$ contain 10 to 22 carbon atoms. Preferred alkyl groups $R^2$ and $R^3$ are iso-tridecyl and tetradecyl. $R^2$ and $R^3$ as phenyl which is substituted by one or two $C_8$–$C_{12}$alkyl groups can be e.g. p-octylphenyl, p-(2-ethylhexyl)-phenyl, p-nonylphenyl, p-(3,7-dimethyloctyl)-phenyl, 3,5-dinonylphenyl. p-Nonylphenyl is especially preferred.

Where $R^3$ is the group $-Sn(OR^2)(R^1)_2$, $R^1$ and $R^2$ are the same radicals as described above.

$R^4$ can be group $-S-(CH_2CH_2-COOR^5$, wherein $R^5$ is $C_6$–$C_{14}$alkyl, e.g. 2-ethylhexyl, decyl, dodecyl, isotridecyl, tetradecyl. $R^5$ is preferably 2-ethylhexyl, dodecyl and isotridecyl, especially 2-ethylhexyl and isotridecyl.

$R^4$ can be the group $-X-Sn(R^1)_n(S-CH_2CH_2-COOR^5)_{3-n}$, wherein X, $R^1$, $R^5$ and n are as defined above. Preferably, $R^4$ is $-S-CH_2CH_2-COOR^5$.

$R^6$ as $C_{10}$–$C_{30}$alkyl is e.g. decyl, dodecyl, isotridecyl, tetradecyl, iso-octadecyl, nonadecyl, docosyl, hexacosyl.

Preferably, $R^6$ is $C_{10}$–$C_{22}$alkyl, most preferably 16-methylheptadecyl, iso-nonyl and n-undecyl.

Examples of compounds of the formula I are:
dibutyl-tin ditetradecyl oxide dibutyl-tin-di-isotridecyl oxide
dibutyl-tin-bis-(p-octylphenyl oxide)
dioctyl-tin-bis-(p-nonylphenyl oxide)
dioctyl-tin(ditetradecyl oxide)
bis(dibutyl-p-nonylphenyloxy-tin)oxide
bis(dioctyl-p-octylphenyloxy-tin)oxide
bis(dibutyl-isotridecyloxy-tin)oxide
bis(dibutyl-tetradecyloxy-tin)oxide.

Preferred compounds of the formula I are dibutyl-tin ditetradecyl oxide, dibutyl-tin diisotridecyl oxide, and dibutyl-tin bis-(p-nonylphenyl)oxide.

Examples of compounds of the formula II are:
octyl-tin tris(dodecyl-$\beta$-mercaptopropionate)
dibutyl-tin bis(isotridecyl-$\beta$-mercaptopropionate)
dibutyl-tin bis(2-ethylhexyl-$\beta$-mercaptopropionate)
bis(dibutyl-tin-2-ethylhexyl-$\beta$-mercaptopropionate)oxide.

The preferred compound of the formula II is dibutyl-tin bis(2-ethylhexyl-$\beta$-mecaptopropionate).

A preferred example of the compound of the formula III is butyl(2-dodecyloxycarbonylethylmercapto)-tin sulfide.

Examples of the compounds of the formula IV are:
dibutyl-tin dilaurate
bis(dibutyl isodecanoyl-tin)oxide
dibutyl-tin di-isooctadecylate.

The preferred compound of the formula IV is dibutyl-tin di-isooctydecylate.

The chlorinated polymers which contain the stabiliser mixture of the invention can be homopolymers, e.g. polyvinyl chloride, polyvinylidene chloride etc. Suitable polymers are emulsion, suspension and mass polyvinyl chloride. The polymers can also be copolymers which have been obtained by copolymerising vinyl chloride or vinylidene chloride with other ethylenically unsaturated monomers. Ethylenically unsaturated monomers are compounds which contain polymerisable C—C double bonds, and comprise acrylates, e.g. acrylic acid, ethyl acrylate, acrylonitrile; vinyl monomers, e.g. styrene, vinyl acetate; maleic acid derivatives, e.g. maleic acid, maleates, maleic anhydride.

The mixtures of this invention can also be employed as activators for foaming plastics materials. These plastics materials can be chlorinated polymers, such as those described above; but polyesters, polylactones, polyamides, polyethers, polycarbonates and, preferably, polyols, are also suitable.

It is especially preferred to use the mixtures of this invention in polymers based on polyvinyl chloride, especially in PVC, viz. both in plasticised PVC and in rigid PVC. Rigid PVC which has been stabilised with the mixtures of this invention is most suitable for external use.

Organo-tin alcoholates as activators are known from German Offenlegungschrift No. 2 444 991. Organo-tin alcoholates and organo-tin carboxylates as light and heat stabilisers for halogenated polymers have been described in the above mentioned German Offenlegungschrift No. 1 926 949 in combination with organo-tin mercaptocarboxylates. These latter are also known from U.S. Pat. No. 3,642,677.

The organo-tin oxides can be obtained in known manner by hydrolysis of the corresponding organo-tin halides. Organo-tin alcoholates can also be obtained in known manner from the corresponding organo-tin halides with sodium alcoholate or from organo-tin oxides with alcohol. The organo-tin carboxylates can be obtained by simple reaction of the alkali salts of the acid in question with a water-soluble salt of tin.

A particularly uncomplicated method of manufacture is to react the alcohol, carboxylic acid, mercaptan and tin reactants simultaneously.

The amount of organo-tin compounds in the substrates depends on economic and technical aspects. As a rule, 0.1 to 0.3% by weight, based on the polymer, especially 0.3 to 2% by weight, is added. The weight ratio of organo-tin compounds of the formulae I:II, I:III, II:IV or III:IV in the mixtures of the invention is 9:1 to 1:9, preferably 9:1 to 6:4.

If desired, it is possible to add to the stabilised polymer mixtures of the invention 0.1 to 5% by weight, preferably 0.5 to 3% by weight, of conventional additives, especially antioxidants, light stabilisers or mixtures thereof. Examples of such additives are:

antioxidants, such as 2,6-dialkylphenols, e.g. 2,4,6-tri-tert-butylphenol, 2,6-di-tert-butyl-4-methylphenol, 2-tert-butyl-4,6-dimethylphenol, the $\beta$-(3,5-di-tert-butyl-4-hydroxyphenyl)-propionic acid ester of pentaerythritol (IRGANOX 1010) or the same ester of stearyl alcohol (IRGANOX 1076), and others such as bisphenol A, UV-absorbers and light stabilisers such as 2-(2'-hydroxyphenyl)-benztriazoles, 2,4-bis(2'-hydroxyphenyl)-6-s-triazines, 2-hydroxybenzophenones, 1,3-bis-(2'-hydroxybenzoyl)-benzenes, esters of unsubstituted or substituted benzoic acids, acrylates, and also nickel compounds, sterically hindered amines, oxalic diamides, or other additives, e.g. plasticisers, lubricants, emulsifiers, fillers, carbon black, asbestos, kaolin, talc, glass fibres, pigments, fluorescent whitening agents, flame retardants, antistatic agents.

The mixture of organo-tin compounds of this invention can be blended with the polymer by known methods in known mixing devices. To this end, it is possible to add the blowing agent for foamed plastics material together with the organo-tin activator, or to blend the activator with a plastics material which already contains the blowing agent. In order to obtain as homogeneous mixtures as possible, it is advantageous to blend the individual components in powder form. It is possible, however, to use plastics granulates, in which case a binder can additionally be employed for better adhesion of the blowing agent and/or the organo-tin activator.

The mixtures of the present invention are surprisingly effective heat and light stabilisers. Owing to their excellent light protective action, the stabilised polymer is especially suitable for external use. In addition, the mixtures of the invention are surprisingly effective activators for the manufacture of foamed plastics.

The invention is illustrated in more detail by the following examles, in which parts and percentages are by weight unless otherwise stated.

EXAMPLE 1

Dibutyl-tin dialcoholate 37.5 g (0.15 mole) of dibutyl-tin oxide are reacted with 61.0 g (0.30 mole) of a technical mixture of about 36% of lauryl alcohol and about 64% of myristyl alcohol (average molecular weight about 203) in boiling toluene, while removing the water of reaction. The toluene is then removed, affording a colourless fluid which, on standing, slowly solidifies to a wax-like substance.

The product obtained contains a mixture of 36% of lauryl alcohol and b 64% of myristyl alcohol.

Sn (found): 18.0%, $n_{20}^D = 1.4715$.

EXAMPLE 2

Dibutyl-tin bis(-2-ethylhexyl-$\beta$-mercaptopropionate)

25.0 g (0.1 mole) of dibutyl-tin oxide is reacted with 43.6 g of 2-ethylhexyl thiopropionate at 110° C. under a water jet vacuum until the water of reaction has been completely removed.

Sn (found): 17.1%; $n_{20}^D = 1.5015$.

The stabiliser mixture results when the 30% of the compound obtained is mixed with 70% of dibutyl-tin dialcoholate (from Example 1) at about 70° C. ($n_{20}^D = 1.4786$).

EXAMPLE 3

(Simultaneous Reaction)

Mixture of

| | | |
|---|---|---|
| I. | $(C_4H_9)_2Sn(-O-i-C_{13}H_{27})_2$, | (30.0%) |
| II. | $(C_4H_9)_2Sn(-S-CH_2CH_2-COO-i-C_{13}H_{27})_2$ and | (29.6%) |
| IV. | $(C_4H_9)_2Sn(-OOC-i-C_{17}H_{35})_2$ | (40.4%) |

62.7 g of dibutyl-tin oxide (0.25 mole) are reacted in 350 ml of boiling toluene with 36.0 g (0.18 mole) of iso-tridecanol, 56.1 g (0.18 mole) of isostearic acid and 41.6 g (0.14 mole) of isotridecyl thiopropionate, while removing the water of reaction. The toluene is then removed, affording 195 g of a colourless fluid.

Sn (found): 14.15%; $n_{20}^D = 1.4831$.

The weight ratio of I:II is 1:1.

EXAMPLE 4

(Simultaneous Reaction)

Mixture of

| | | |
|---|---|---|
| I. | $(C_4H_9)_2Sn(-O-i-C_{13}H_{27})_2$, | (20.4%) |
| II. | $(C_4H_9)_2Sn(-S-CH_2CH_2-COO-i-C_{13}H_{27})_2$ and | (52.0%) |
| IV. | $(C_4H_9)_2Sn(-OOC-i-C_{17}H_{35})_2$ | (27.6%) |

32.15 g (0.129 mole) of dibutyl-tin oxide are reacted in 150 ml of boiling toluene with 12.91 g (0.065 mole) of iso-tridecanol, 20.08 g (0.065 mole) of iso-stearic acid and 37.18 g (0.129 mole) of isotridecyl thiopropionate, while removing the water of reaction. The toluene is then removed, affording a colourless fluid.

$n_{20}^D = 1.488$.

The weight ratio of I:II is 1:2.5.

EXAMPLE 5

| | |
|---|---|
| V. $(C_4H_9)_2Sn(OOC-C_{11}H_{23})-O-Sn(C_4H_9)_2(OOC-C_{11}H_{23})$ | (70%) |
| II. $(C_4H_9)_2Sn(-S-CH_2CH_2-COO-i-C_8H_{17})_2$ | (30%) |

39.6 g (0.159 mole) of dibutyl-tin oxide are reacted with 31.8 g (0.159 mole) of lauric acid at 110° C. while removing the water of reaction. The resultant fluid reaction product is mixed with 30 g of dibutyl-tin bis(2-ethylhexyl-$\beta$-mercaptopropionate) obtained in accordance with Example 2.

Sn (found): 24.5%, $n_{20}^D = 1.4928$.

The weight ratio of II:V is 1:2.3.

EXAMPLE 6

(Simultaneous Reaction)

Mixture of

| | | |
|---|---|---|
| I. | $(C_4H_9)_2Sn(-O-i-C_{13}H_{27})_2$ | (28.6%) |
| II. | $(C_4H_9)_2Sn(-S-CH_2CH_2-COO-i-C_{13}H_{27})_2$ | (28.8%) |
| IV. | $(C_4H_9)_2Sn(-OOC-i-C_{17}H_{35})_2$ + | (38.6%) |
| | IRGANOX 1076 | (4%) |

32.7 g (0.13 mole) of dibutyl-tin oxide are reacted in 150 ml of boiling toluene with 18.8 g (0.09 mole) of iso-tridecanol, 29.2 g (0.09 mole) of isostearic acid and 21.7 g (0.07 mole) of isotridecyl thiopropionate, while removing the water of reaction. After the toluene has been removed, 4.0 g of Irganox 1076 are dissolved in the residue. After filtration, a fluid having the following characteristic data is obtained.

Sn: 15.0%.

$d_{20}$: 1.021.

$n_{20}^D$: 1.4817.

The weight ratio of I:II is 1:1.

EXAMPLE 7

Mixture of

| | | |
|---|---|---|
| I. | $(C_4H_9)_2Sn(-O-i-C_{13}H_{27})_2$ | (13.3%) |
| II. | $(C_4H_9)_2Sn(-S-CH_2CH_2-COO-i-C_{13}H_{27})_2$ | (28.8%) |
| IV. | $(C_4H_9)_2Sn(-OOC-i-C_{17}H_{25})_2$ + | (53.9%) |
| | IRGANOX 1076 | (4%) |

Component 1 (dibutyl-tin alcoholate-carboxylate)

21.0 g (0.08 mole) of dibutyl-tin oxide are reacted in 150 ml of boiling toluene with 39.3 g (0.13 mole) of isostearic acid and 8.4 g (0.04 mole) of isotridecanol, while removing the water of reaction. The toluene is then removed by distillation.

Component 2 (dibutyl-tin isotridecyl-bis-thiopropionate)

8.9 g (0.036 mole) of dibutyl-tin oxide are reacted at 110° C. with 20.46 g (0.072 mole) of isotridecyl thiopropionate, while removing the water of reaction by distillation.

67.2 g of component (1) and 28.8 g of component (2) are mixed at 50° C. and then 4.0 g of Irganox are dissolved in the mixture. After filtration, a liquid having the following characteristic data is obtained.

Sn: 14.2%.

d(20°): 1.033.

$n_{20}^D$: 1.4861.

The mixture ratio of I:II is 1:2.1.

EXAMPLE 8

Mixture of

| | | |
|---|---|---|
| I. | 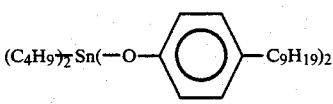 | (16.0%) |
| II. | $(C_4H_9)_2Sn(-S-CH_2CH_2-COO-i-C_8H_{17})_2$ | (19.0%) |
| IV. | $(C_4H_9)_2Sn(-OOC-i-C_{17}H_{35})_2$ | (61.0%) |
| | + IRGANOX 1076 | (4.0%) |

$(C_4H_9)_2Sn(-O-\phantom{}$⟨ring⟩$-C_9H_{19})_2$ 23.8 g (0.096 mole) of dibutyl-tin oxide are reacted at 110° C. with 10.5 g (0.049 mole) of nonylphenol and 44.4 g (0.143 mole) of isostearic acid, while removing the water of reaction. The resultant liquid reaction product is mixed with 19.0 g of dibutyl-tin bis(2-ethyl-hexyl-$\beta$-mercaptopropionate) and 4.0 g of Irganox 1076.

Sn (found): 14.6%; $n_{20}{}^D = 1.4862$.

The weight ratio of I:II is 1:1.2.

Application Tests

EXAMPLE 9

Static Heat Test (a) A dry blend consisting of 100 parts of PVC (Solvic 264 GA; Deutsche Solvay-Werke), 0.2 part of lubricant (Wax E, Hoechst AG), 0.2 part of Tinuvin 320 (2-[2'-hydroxy-3',5'-di-tert-butylphenyl]-benztriazole) and 2.5 part of the stabiliser mixture of Example 2, is rolled for 5 minutes at 180° C. on mixer rolls, and afterwards samples of sheet with a thickness of 0.3 mm are taken.

The samples are subjected to heat in an oven at 180° C. and every 15 minutes the thermal ageing of a sample is determined according to the Yellowness Index (Y.I.) of ASTM D 1925-70.

| | Yellowness Index (Y.I.) | | | | | | |
|---|---|---|---|---|---|---|---|
| time in mins. | 15 | 30 | 45 | 60 | 75 | 90 | 105 |
| Y.I. | 14.8 | 17.7 | 19.5 | 22.5 | 28.6 | 34.8 | 72.4 |

(b) The test is carried out by the same method as described in 9(a), except that the dry blend consists of the following constituents: 100 parts of PVC (Vestolit P 1973 K), 4 parts of TiO$_2$, 0.2 part of lubricant (Wax E, Hoechst AG), 2.5 parts of stabiliser mixture.

| | Yellowness Index (Y.I.) | | | | | | |
|---|---|---|---|---|---|---|---|
| time in mins. | 15 | 30 | 45 | 60 | 75 | 90 | 105 |
| Y.I. | 8.6 | 10.2 | 12.1 | 13.9 | 16.5 | 19.6 | 33.8 |

EXAMPLE 10

Mill Ageing Test

A dry blend consisting of 100 parts of PVC (Vestolit HIS 6882), 4 parts of TiO$_2$ and 2.5 parts of stabiliser mixture of Example 5 is subjected to a mill ageing test at 200° C., and samples are taken at 3 minute intervals to determine the Yellowness Index.

| | Yellowness Index (Y.I.) | | | | | | | | | | | |
|---|---|---|---|---|---|---|---|---|---|---|---|---|
| time in mins. | 3 | 6 | 9 | 12 | 15 | 18 | 21 | 24 | 27 | 30 | 33 | 36 |
| Y.I. | 6.7 | 7.4 | 8.3 | 9.0 | 9.9 | 11.5 | 12.5 | 14.3 | 16.9 | 20.7 | 28.2 | 37.7 |

EXAMPLE 11

Weathering Test 100 parts of PVC are mixed with 0.2 part of Tinuvin 320 and 2.5 parts of the stabiliser mixture of Example 2 in a high-speed mixer. The mixture is rolled to a sheet for 5 minutes at 180° C. on a laboratory roll mill, and from this sheet a 0.5 mm transparent sheet is pressed at 180° C. on a daylight-press. This sheet is exposed to an accelerated weathering test (Xenotest 150 lamp, Original Hanau Quarzlampen GmbH, Hanau, West Germany). The weathering cycle comprises 29 minutes exposure to xenon-arc radiation and 1 minute exposure to artificial rain. Exposure is effected in rotation. In the table below, h indicates the total weathering time in hours. The test values indicate the course of yellowing (Yellowness Indices).

| | Yellowness Index (Y.I.) | | | | | | |
|---|---|---|---|---|---|---|---|
| Time | 600$^h$ | 1200$^h$ | 1800$^h$ | 2400$^h$ | 3000$^h$ | 3600$^h$ | 4200$^h$ |
| Y.I. | 3.5 | 3.6 | 3.6 | 5.4 | 5.2 | 4.7 | 4.8 |
| Time | 4200$^h$ | 4800$^h$ | 5400$^h$ | 6000$^h$ | 6600$^h$ | 7200$^h$ | 7800$^h$ 8400$^h$ |
| Y.I. | 4.8 | 6.8 | 8.4 | 10.1 | 11.4 | 10.0 | 12.8 23.7 |

EXAMPLE 12

The weathering test as described in Example 12 is repeated, except that 100 parts of PVC (Vestolit HIS 6882), 4 parts of TiO$_2$ and 2.5 parts of stabiliser mixture are used, and exposure is effected with a Xenotest 1200 lamp. The test results are reported in the following table.

| | Yellowness Index (Y.I.) | | | | | | | | | |
|---|---|---|---|---|---|---|---|---|---|---|
| Time | 600$^h$ | 1200$^h$ | 1800$^h$ | 2400$^h$ | 3000$^h$ | 3600$^h$ | 4200$^h$ | 4800$^h$ | 5400$^h$ | 6000$^h$ |
| stabiliser of Example 6 | 7.3 | 5.0 | 5.1 | 4.7 | 3.8 | 4.0 | 4.1 | 3.9 | 4.2 | 3.8 |
| stabiliser of Example 7 | 4.8 | 4.2 | 4.1 | 4.3 | 3.7 | 3.8 | 3.6 | 3.5 | 4.1 | 3.9 |

EXAMPLE 13

The weathering test of Example 11 is repeated using a dry blend consisting of 100 parts of PVC (Vestolit HIS 6882), 4 parts of titanium dioxide and 2.5 parts of the stabiliser mixture of Example 5. The results are reported in the following table.

| Time | 0 | 2400$^h$ | 4800$^h$ | 7200$^h$ | 9600$^h$ | 12000$^h$ |
|---|---|---|---|---|---|---|
| Y.I. | 8.2 | 5.2 | 4.8 | 4.1 | 4.4 | 5.7 |

Even after 1200$^h$ weathering, the sheet exhibits no discolouration.

EXAMPLE 14

Activator Effect 10 parts of dioctyl phthalate and 2 parts of azodicarboxamide are mixed with 1 part of the stabiliser mixture of Example 2 as activator, and this mixture is kept at a constant temperature of 180° C. in a flask. The flask is connected to a gas burette and the amount of gas evolved is read off at specific intervals of time. The following result is obtained.

| min.: | 0.5 | 1.0 | 1.5 | 2.0 | 2.5 | 3.0 | 3.5 | 4.0 | 4.5 | 5.0 | 10.0 |
|---|---|---|---|---|---|---|---|---|---|---|---|
| ml: | 29 | 33 | 36 | 46 | 62 | 104 | 143 | 156 | 169 | 189 | 228 |

What is claimed is:

1. A mixture comprising an organo-tin mercaptide of the formula II

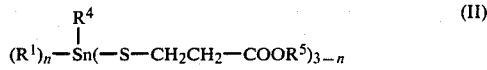

and an organo-tin carboxylate of the formula V

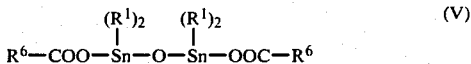

wherein $R^1$ is $C_1$-$C_{12}$alkyl, X is sulfur or oxygen, $R^4$ is $-S-CH_2CH_2-COOR^5$ or $-X-Sn(R^1)_n(S-CH_2CH_2-COOR^5)_{3-n}$, in which $R^1$ and X are as defined above, $R^5$ is $C_8$-$C_{14}$alkyl, n is 1 or 2, and $R^6$ is $C_{10}$-$C_{30}$alkyl, and the weight ratio of II:V is in the range from 9:1 to 1:9.

2. A mixture according to claim 1, wherein $R^4$ in the compound of the formula (II) is the $-S-CH_2CH_2-COOR^5$ group, in which $R^5$ is $C_8$-$C_{14}$alkyl.

3. A mixture according to claim 2, wherein $R^5$ is 2-ethylhexyl.

4. A mixture according to claim 1, wherein $R^6$ is n-undecyl.

5. A method for stabilizing chlorinated polymers against the degradative effective of light and heat which comprises incorporating into said polymer an effective stabilizing amount of a mixture according to claim 1.

6. The method of claim 5, wherein said polymer is rigid polyvinylchloride.

7. A chlorinated polymer containing an effective stabilizing amount of a mixture according to claim 1.

8. A foamed plastics material containing an effective foam activating amount of a mixture according to claim 1.

* * * * *